United States Patent [19]
Ruthrof et al.

[11] Patent Number: 5,335,535
[45] Date of Patent: Aug. 9, 1994

[54] MONITORABLE DEVICE AND METHOD FOR MONITORING A DEVICE FOR SEALING OFF A BODY

[75] Inventors: Klaus Ruthrof, Nürnberg; Peter Jax, Erlangen; Karl-Heinz Bode, München; Klaus Günther, Hamburg, all of Fed. Rep. of Germany

[73] Assignee: Siemens Aktiengesellschaft, Munich, Fed. Rep. of Germany

[21] Appl. No.: 977,101

[22] Filed: Nov. 16, 1992

[30] Foreign Application Priority Data

Nov. 14, 1991 [DE] Fed. Rep. of Germany ....... 4137473

[51] Int. Cl.$^5$ .............................................. G01M 3/20
[52] U.S. Cl. ..................................... 73/40.7; 405/54
[58] Field of Search .............. 73/40.7, 40; 405/53, 405/54, 55, 129, 128

[56] References Cited

U.S. PATENT DOCUMENTS

| | | | |
|---|---|---|---|
| 2,504,530 | 4/1950 | Jacobs | 73/40.7 |
| 3,842,659 | 10/1974 | Bacroix | 73/40.7 |
| 4,439,062 | 3/1984 | Kingsbury | 588/259 |
| 4,753,551 | 6/1988 | Brueggemann et al. | 405/128 |
| 4,796,676 | 1/1989 | Hendershot et al. | 141/83 |
| 4,916,937 | 4/1990 | Robertson et al. | 405/55 |
| 5,046,353 | 9/1991 | Thompson | 73/40.7 |
| 5,076,728 | 12/1991 | Golding | 73/40.7 |
| 5,215,409 | 6/1993 | Jax et al. | 405/129 |

FOREIGN PATENT DOCUMENTS

| | | |
|---|---|---|
| 0251026 | 1/1988 | European Pat. Off. . |
| 2431907 | 7/1977 | Fed. Rep. of Germany . |
| 3417332 | 11/1985 | Fed. Rep. of Germany . |
| 3540715 | 5/1987 | Fed. Rep. of Germany . |
| 3604600 | 8/1987 | Fed. Rep. of Germany . |
| 3616377 | 11/1987 | Fed. Rep. of Germany . |
| 3811487 | 10/1988 | Fed. Rep. of Germany . |
| 9107693 | 10/1991 | Fed. Rep. of Germany . |

OTHER PUBLICATIONS

Publication: Umwelt & Technik Oct. 1990, pp. 34 and 36.
"Leak Detection and Location System" LEOS, Siemens AgG14 KWU Group, pp. 1-12, Nov. 1988.
"Long-Term Monitoring of Landfills with LEOS" Siemens AG-KWU Group, pp. 1-4, Oct. 1988.

Primary Examiner—Hezron E. Williams
Assistant Examiner—Michael Brock
Attorney, Agent, or Firm—Herbert L. Lerner; Laurence A. Greenberg

[57] ABSTRACT

A monitorable device for sealing off a body, in particular a garbage dump or a landfill, includes two seals sealing off a body and being mutually spaced-apart defining a control chamber between the seals. The control chamber has connections for an inlet opening and an outlet opening and is otherwise closed. A permeable channel or hose is connected between the inlet opening and the outlet opening in the control chamber for carrying a transport medium. A lance which is used for supplying a tracer gas may be disposed outside the control chamber and may face toward one of the seals. A sensor is connected to the outlet opening for detecting the tracer gas. A method for monitoring a device for sealing off a body includes sealing off a body with two seals being mutually spaced-apart defining a control chamber between the seals being closed except for connections for an inlet opening and an outlet opening. A transport medium is passed through a permeable channel or hose in the control chamber between the inlet opening and the outlet opening. If a tracer gas is admitted through one of the seals, an appearance of the tracer gas at the outlet opening is monitored. A leakage site is determined from the monitoring of the tracer gas.

6 Claims, 1 Drawing Sheet

MONITORABLE DEVICE AND METHOD FOR MONITORING A DEVICE FOR SEALING OFF A BODY

BACKGROUND OF THE INVENTION

1. Field of the Invention

The invention relates to a monitorable device for sealing off a body, in particular a garbage dump or a landfill, having two mutually spaced-apart seals defining a control chamber therebetween, the control chamber being closed except for connections for an inlet opening and an outlet opening for a transport medium, the inlet opening communicating with the outlet opening in the control chamber through a permeable channel or hose, and a sensor connected to the outlet opening for a substance to be monitored. The invention also relates to a method for monitoring such a device for sealing off a body.

2. Description of the Related Art

German Petty Patent No. G 91 07 693.5, generally corresponding to co-pending U.S. application Ser. No. 730,619, filed Jul. 16, 1991, discloses an element for sealing and monitoring a body, in particular a trash dump or landfill. The element includes two spaced-apart seals. A permeable channel or a hose for a transport medium, with an inlet opening on one end and an outlet opening on one end, is located between the seals. Except for leaving the openings free, the two seals are tightly joined together at edges thereof. A transport medium is fed into the inlet opening at predetermined time intervals. The outlet opening is connected to a sensor. If one of the two seals has a leak, then a substance, such as a pollutant, generally travels into the channel or hose from the outside. The substance is carried to the sensor along with the transport medium, and the sensor records the substance. If the flow speed of the transport medium is known, then a conclusion as to the site of the leak can be drawn from the instant when the substance enters the sensor.

In the case of locating leaks, a leakage locating system known from German Patent No. 24 31 907, corresponding to U.S. Pat. No. 3,977,233, for instance, is utilized.

With the known apparatus, a leak in one of the two seals can easily be detected if a substance which is a gas enters through the leak from the outside. It is then only necessary to use a suitable gas sensor. However, if the substance to be monitored is a liquid, in particular water or an aqueous solution, determining the leakage site becomes difficult. If the invading liquid is to be detectable in the transport medium, it is necessary for the transport medium to be primarily dry. If the transport medium were saturated with water, then water itself invading through a leak could not be recorded by a suitable water sensor. However, if the control chamber is primarily dry, the invasion of even a small amount of water represents a pronounced locally defined change in the water content in the control chamber. Such a water quantity can then be carried with the transport medium to the sensor. Since the transport medium is fed in at regular intervals, a conclusion as to the leakage site can be drawn from the instant of the entry of the water at the sensor.

It is technologically difficult to maintain a dry control chamber. Drying agents that even absorb moisture from the transport medium must be used in the control chamber. If the control chamber, for the sake of mechanical stability, contains a gas-permeable and liquid-permeable medium, then the medium must be kept dry as well.

SUMMARY OF THE INVENTION

It is accordingly an object of the invention to provide a leakage monitorable device and a method for monitoring a leakage device for sealing off a body, in particular a garbage dump or landfill, which overcome the hereinafore-mentioned disadvantages of the heretofore-known methods and devices of this general type, which provide a device that requires no drying agent and need not otherwise be kept dry, yet nevertheless makes it possible to recognize and detect the entry of a liquid through a leak, and which provide a method for monitoring this kind of sealing device with which leaks, especially leaks through which water enters, can be located, without using drying agents.

With the foregoing and other objects in view there is provided, in accordance with the invention, a monitorable device for sealing off a body, in particular a garbage dump or a landfill, comprising two seals sealing off a body and being mutually spaced-apart defining a control chamber between the seals; the control chamber having connections for an inlet opening and an outlet opening and being otherwise closed; a permeable channel or hose being connected between the inlet opening and the outlet opening in the control chamber for carrying a transport medium; a lance, which may be disposed outside the control chamber and may face or be oriented toward one of the seals, for supplying a tracer gas; and a sensor for a substance to be monitored, being connected to the outlet opening for detecting the tracer gas.

If a leak in one of the seals is suspected, then the tracer gas is sent from outside through the lance to the seal. The tracer gas, which may be an arbitrary, easily detected gas, then passes through the existing leak into the control chamber and from there into the permeable channel or hose. Since the afore-mentioned sensor is present and is sensitive to the tracer gas, it is possible, by feeding the transport medium into the control chamber at intervals, to determine the leakage site from the instant at which the tracer gas arrives at the sensor. Any existing moisture in the control chamber is no hindrance to the propagation of the tracer gas. Some quantity of fluid may accordingly always be present.

In accordance with another feature of the invention, there is provided a level gauge for liquid being disposed in the control chamber.

The control chamber may be damp or dry. If liquid from outside gets into the control chamber after a leak occurs in one of the seals, an increase in the fluid quantity there occurs. This increase is recognized by the liquid level gauge, which is known per se. To that end, the liquid level gauge is as a rule disposed at the lowest point of the device, because the liquid collects there first. The precise site of the leak cannot yet be determined with the level gauge alone. The level gauge merely provides some indication that the leak exists. Once the existence of the leak has been determined, the lance is introduced outside the control chamber.

An advantage of the device according to the invention is that the invasion of liquid through a leak in a seal can be easily located, without having to keep the control chamber between the seals constantly dry. This economizes on expensive means for continuously drying the control chamber and the transport medium.

With the objects of the invention in view, there is also provided a method for monitoring a device for sealing off a body, in particular a garbage dump or a landfill, which comprises sealing off a body with two seals being mutually spaced-apart defining a control chamber between the seals being closed except for connections such as for an inlet opening and an outlet opening; passing a transport medium through a permeable channel or hose in the control chamber between the inlet opening and the outlet opening; admitting a tracer gas through one of the seals or acting upon one of the seals with the tracer gas; monitoring an appearance of the tracer gas at the outlet opening; and determining a leakage site from the monitoring of the tracer gas.

Through the use of the tracer gas, once the leak is recognized, an easily detected medium, in the form of tracer gas, is brought to the vicinity of the leak. The tracer gas need not be continuously present at the seal. Nor is it necessary to keep the control chamber constantly dry in the event that the substance that could invade the control chamber through a leak is a liquid.

In accordance with a concomitant mode of the invention, there is provided a method which comprises measuring the liquid level in the control chamber, and acting upon one of the seals with the tracer gas, depending on the level or on the attainment of a predetermined level.

With this method, only the existence of a leak through which a liquid invades is initially ascertained.

In order to provide accurate location of the leak with the aid of a leak locating method, the entire device that has the leak is then acted upon by tracer gas, which even in a very damp control chamber can be brought as far as the sensor by the transport medium through the channel or hose.

A reliable and simple method and a suitable device are advantageously made available.

If the device for sealing the body (garbage dump or landfill) includes a plurality of segments partitioned off from one another, then only the segment in which a rise in the liquid level has been determined by the level gauge needs to be acted upon by the tracer gas.

Other features which are considered as characteristic for the invention are set forth in the appended claims.

Although the invention is illustrated and described herein as embodied in a monitorable device and a method for monitoring a device for sealing off a body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
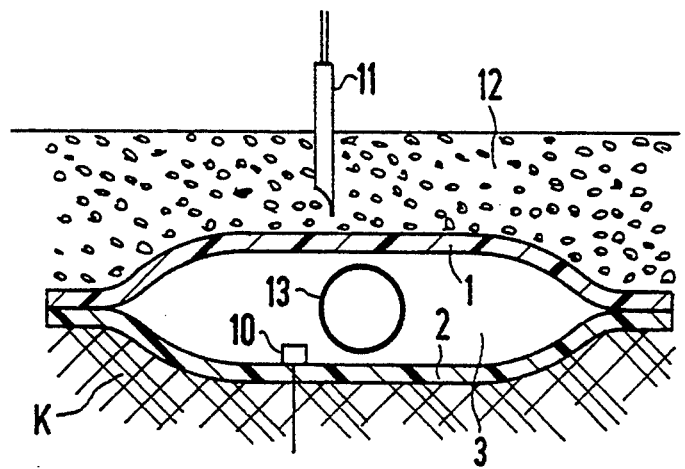
FIG. 1 is a fragmentary, diagrammatic, cross-sectional view of a device for sealing off a body, having means for monitoring and locating leaks.

Referring now to the figures of the drawing in detail and first, particularly, to FIG. 1 thereof, there is seen a device for sealing off a body K, in particular a garbage dump or landfill, which has two spaced-apart seals 1 and 2, that are firmly joined together at edges thereof. Between the two seals 1 and 2, which may be plastic foils or films, there is a control chamber 3, in which a permeable channel or hose 13 is disposed or laid. The hose 13 may be laid in a meandering pattern.

Figure 2:
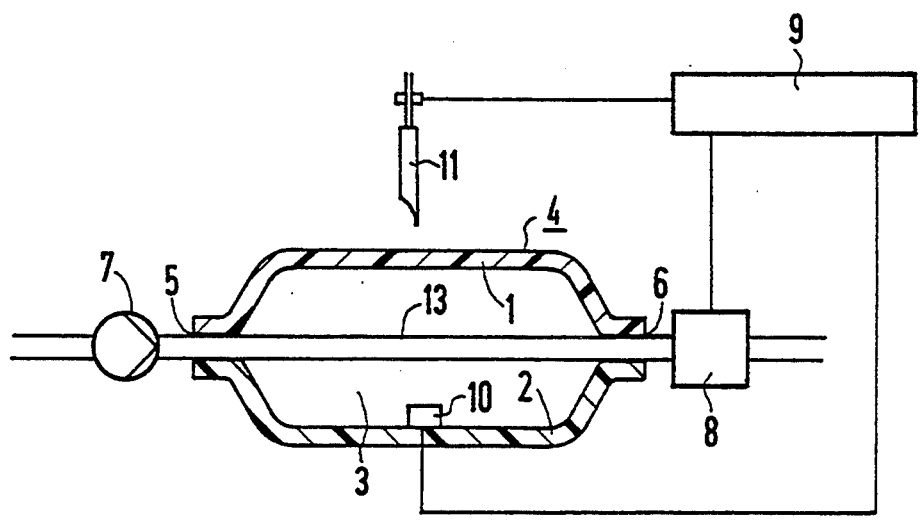
FIG. 2 is another cross-sectional view of the device along with a block circuit diagram, showing further details.

FIG. 2 shows an element 4 including two seals 1 and 2 and a control chamber 3, with a hose 13. A plurality of such elements 4 may be joined together. The element 4 has an inlet opening 5 and an outlet opening 6, which communicate with one another through the channel or hose 13. A controllable pump 7 for the controlled feeding in of a transport medium is associated with the inlet opening 5. A sensor 8 connected to the outlet opening 6 and communicates with an evaluation unit 9.

In order to recognize whether liquid has entered the control chamber 3 through a leak in the seal 1 or the seal 2, a liquid level gauge 10 is disposed in the control chamber 3, for instance at its lowermost point. The level gauge 10 communicates with the evaluation unit 9. If a liquid enters the control chamber 3 through a leak in the seal 1 or 2, this is recognized by the level gauge 10, which outputs a signal. In order to enable a determination of the site of the leak, a lance 11 through which a tracer gas is brought to the vicinity of the seal 1 or 2 is activated, once the signal of the level gauge 10 has arrived at the evaluation unit 9. The tracer gas then passes through the leak in the seal 1 or 2 into the control chamber 3 and from there into the channel or hose 13. There, it is brought with the transport medium to the sensor 8, which is sensitive to the tracer gas. In the evaluation unit 9, the leakage site in the seal 1 or 2 is determined from the time of arrival of the tracer gas at the sensor 8.

The lance 11 may be permanently installed above the seal 1 or below the seal 2, in which case it is only acted upon by the tracer gas as needed. The lance 11 may be connected to the evaluation unit 9 for that purpose. Alternatively, the lance 11 can be positioned only as needed. Since, as a rule, a layer of material 12, for example gravel, is present above the seal 1 as is shown in FIG. 1, the lance 11 is introduced into this layer of material 12. The tracer gas then spreads out inside this layer of material 12 along the seal 1 and in this way reaches a possible leak. Once the existence of a leak has been recognized by the level gauge 10, the leakage site is determined by means of the tracer gas.

We claim:

1. A monitorable device for sealing off a body, comprising:

two seals sealing off a body and being mutually spaced-apart defining a control chamber between said seals;

said control chamber having connections for an inlet opening and an outlet opening and being otherwise closed;

a permeable channel or hose being connected between said inlet opening and said outlet opening in said control chamber for carrying a transport medium;

a lance for supplying a tracer gas; and a sensor connected to said outlet opening for detecting the tracer gas.

2. The monitorable device according to claim 1, wherein said lance is disposed outside said control chamber for bringing the tracer gas into the vicinity of one of said seals.

3. The monitorable device according to claim 1, including a level gauge disposed in said control chamber for gauging liquid.

4. A method for monitoring a device for sealing off a body, which comprises:

sealing off a body with two seals being mutually spaced-apart defining a control chamber between the seals being closed except for connections for an inlet opening and an outlet opening;

passing a transport medium through a permeable channel or hose in the control chamber between the inlet opening and the outlet opening;

acting upon one of the seals with a tracer gas;

monitoring an appearance of the tracer gas at the outlet opening; and determining a leakage site from the monitoring of the tracer gas.

5. The method according to claim 4, which comprises measuring a liquid level in the control chamber, and acting upon one of the seals with the tracer gas dependent on the liquid level.

6. The method according to claim 4, which comprises measuring a liquid level in the control chamber, and acting upon one of the seals with the tracer gas dependent on attainment of a predetermined liquid level.

* * * * *